Patented Sept. 9, 1924.

1,507,624

UNITED STATES PATENT OFFICE.

FRITZ POLLAK AND KURT RIPPER, OF VIENNA, AUSTRIA; SAID RIPPER ASSIGNOR TO SAID POLLAK.

PROCESS FOR MANUFACTURING CONDENSATION PRODUCTS.

No Drawing.  Application filed February 5, 1923. Serial No. 617,164.

*To all whom it may concern:*

Be it known that we, FRITZ POLLAK, a citizen of the Czechoslovak Republic, and KURT RIPPER, a citizen of the Republic of Austria, both residents of Vienna, Austria, have invented certain new and useful Improvements in Processes for Manufacturing Condensation Products, of which the following is a specification.

The invention relates to the manufacture of condensation products, obtained by the reaction of formaldehyde on a urea.

The gluelike condensation products initially yielded by the reaction between these substances are soluble in water, but when treated by heat, are first gelatinized and then are converted into infusible final products wholly insoluble in water.

But the transformation of the soluble gluelike initial condensation products into hard insoluble final products really adapted for industrial use presents uncommon difficulties.

By reacting with formaldehyde upon carbamid without adding any condensing medium according to the U. S. Patent No. 1,355,834 (John) and by producing the final product by continuous heating of the mixture, there results a mass having bubbles interspersed throughout the mass, the bubbles being formed by the gaseous formaldehyde escaping during the hardening. This is because the formaldehyde is not entirely in chemical combination. If on the other hand, the surplus of formaldehyde as prescribed by John (for instance 5 or 6 parts of a commercial solution of (say 40 per cent) formic aldehyde to 1 part of carbamid) is not employed, there is no possibility of obtaining a clear glass-like mass, the producing of which is especially the object of the present process.

By the process described in the prior application Serial No. 528339, filed January 10, 1922 by Fritz Pollak (now Patent 1,458,543) which consists in reacting on a urea with formaldehyde in presence of an agent possessing basic properties while heating the mixture until there is effected the formation of the hard insoluble final product, it was rendered possible to obtain fully transparent glass-like masses even by using a smaller proportion of formaldehyde than would correspond to 3 molecules of formaldehyde to 1 molecule of the urea. In effecting the reaction under such conditions however the hardening process must be carried out in an exceedingly cautious manner.

Now we have discovered that the addition in proper proportions of substances capable of binding or decomposing the free formaldehyde still present in the first formed soluble initial condensation products, before the reaction be permitted to proceed further by heating, facilitates the transformation into the insoluble final products and yields products which are commercially far superior to those obtained by simple heating, in whatever manner the initial chemical action of formaldehyde on a urea may have been effected. Thus according to our invention substances capable of reacting with formaldehyde, with the formation of compounds (which compounds are not gasifiable themselves at the temperatures employed in the course of the hardening process nor emitting gases at those temperatures) may be added to the initial condensation products.

Among the substances capable of binning the formaldehyde we may mention urea itself and its derivatives, or thiourea and its derivatives, also phenols and their derivatives. A substance capable of decomposing formaldehyde is for instance hydrogen peroxid.

By the present invention the additional useful result is obtained, that the heating during the hardening process, by which process the mass is to be reduced to the insoluble state, can be carried out much quicker. Moreover by this way of proceeding it is possible to produce molded objects, the forms of the mold being very sharply reproduced, an item which is of high importance for the production of sticks (rods), plates and the like on an industrial scale. Besides, the masses obtained by this method can be worked without the workman being troubled by the resulting powder, whilst otherwise the masses discharge a powder of penetrating odor.

Furthermore, a very considerable advantage of this process consists in the possibility of heating the initial condensation products, to a temperature of 90 degrees centigrade or more, in order to completely harden them. Practice has shown, that towards the end of the hardening process the maintaining of heating temperatures, which are higher than those heretofore used, is of decisive importance for the production of the best final products possible. Only if the masses, before being completely finished are heated to a temperature of about 100 degrees centigrade, the highest degree of polymerization and disengagement of water is attained, which is desirable for the general availability of the material for producing lathe-work. During the hardening process such high temperatures can only be made use of, if the free formaldehyde eventually still present after the initial condensation process is rendered innoxious as shown by this invention.

The proceeding described above may be utilized for all the condensation products obtained by the reaction between formaldehyde and a urea, whether they are produced by starting with or without the addition of condensing agents. The final hardened products are masses, which are transparent like glass, and colourless or faintly clouded; they are fairly inert to water and other solvents and can be easily worked on the lathe.

The following are examples of carrying the invention into practice:

1. 240 parts by weight of urea, 640 parts by weight of formaldehyde (commercial solution containing 40% by volume) and 24 parts by weight of hexamethylentetramine are heated in a boiler provided with a reflux condenser to obtain the soluble initial condensation products; when this condensation process is finished 5 parts by weight of acetate of sodium are added, whereupon the mixture is distilled in a vacuum apparatus at a low temperature. As soon as the mass is somewhat concentrated, 20 parts by weight of urea are added; then the distillation is continued to the utmost point of viscosity at which the mass is still capable of being cast. Then it is filled into the molds and hardened at temperatures from 60 to 100 degrees centigrade. The obtained final product represents a mass, which is completely limped like water, colourless and odourless and can be easily worked on the lathe; it does not soften any more in the heat and is practically unaffected by solvents as for instance water, alcohol and the like so that it may advantageously be utilized for all the purposes of producing lathe-work.

2. 100 parts by weight of urea and 600 parts by weight of formaldehyde (commercial solution containing 40% by volume) are mixed and heated in an open dish until 60 per cent of the whole weight of the liquid are distilled off. The residue containing a large excess of formaldehyde, represents a limped viscous liquid. Then urea in solid state is added in an amount, based on the quantity of free formaldehyde, in a ratio of 1 molecule of urea to 2 molecules of formaldehyde. The mass is to be mixed until the urea is dissolved, and then submitted in a vacuum apparatus at a temperature below 50 degrees centigrade, to further evaporation pushed on to the utmost point of viscosity at which the mass is still capable of being cast. Now the condensation product is filled into molds and hardened at temperatures from 60 to 100 degrees centigrade. The mass first becomes somewhat clouded, after some time, however, it turns clear again. The resulting product is very similar in its properties to that obtained by the proceeding according to example 1.

Instead of first forming the gluelike initial condensation products of urea and formaldehyde as described in the examples 1 and 2, dimethylolurea (Berliner Berichte vol. 41, page 26) may be used as starting material. In carrying out this process 100 parts by weight of dimethylolurea are mixed with 50 parts by weight of water and heated to the boiling point, whereby a limped solution is obtained. The mass assumes a gluelike consistance. Now 2 parts by weight of urea are added to the solution. The mixture is then submitted to an evaporation in a vacuum apparatus, until just such a consistency has been attained, that the mass is still capable of being cast. Then it is filled into the molds and further treated as described in example 1.

We wish to be understood that we do not desire to be limited to the exact details described, for obvious modifications will occur to a person skilled in the art.

Instead of urea, thiourea or substitution products of urea or of thiourea may be used, all of which we wish to be included along with urea in the designation "a urea" used in the following claims. The formaldehyde may be used either in the commercial aqueous solution or in the gaseous state or in the form of a solution of anhydrous formaldehyde or in the form of the polymers.

We claim:

1. The process for manufacturing condensation products which comprises adding to products resulting from the initial chemical action of formaldehyde on a urea, substances capable of reacting with formaldehyde with the formation of compounds not emitting gases at the temperatures employed in the hardening of the gluelike initial condensation products of this reaction, and then continuing the reaction by heat.

2. The process for manufacturing condensation products which comprises adding to products resulting from the initial chemical action of formaldehyde on a urea, substances capable of reacting with formaldehyde with the formation of compounds not emitting gases at the temperatures employed in the hardening of the gluelike initial condensation products, and then continuing the reaction by heat and completing the hardening process by submitting the mass to a temperature higher than 80 degrees centigrade.

3. The process for manufacturing condensation products which comprises adding to products resulting from the initial chemical action of formaldehyde on a urea substances capable of reacting with formaldehyde with the formation of compounds not emitting gases at the temperatures employed in the hardening of the gluelike initial condensation products, and then continuing the reaction by heat and completing the hardening process by submitting the mass to a temperature higher than 80 degrees centigrade until there is effected the formation of a hard insoluble final product fairly unaffected by water.

4. The process for manufacturing condensation products which comprises adding to the products resulting from the initial chemical action of formaldehyde on a urea, a second quantity of urea, continuing the reaction by heat and completing the hardening process by submitting the mass thus obtained to a temperature higher than 80 degrees centigrade until there is effected the formation of a hard insoluble final product fairly unaffected by water.

5. The process for manufacturing condensation products which comprises adding to the products resulting from the initial chemical action of formaldehyde on a urea, a second quantity of urea, continuing the reaction by heat and completing the hardening process by submitting the mass thus obtained to a temperature of 100 degrees centigrade until there is effected the formation of a hard insoluble final product fairly unaffected by water.

6. The process for manufacturing condensation products from a urea with formaldehyde which comprises transforming the first formed soluble initial condensation products into the insoluble final products in the presence of substances capable of preventing the escape of free formaldehyde during hardening.

7. The process for manufacturing condensation products from a urea with formaldehyde which comprises transforming the first formed soluble initial condensation products into the insoluble final products in presence of a urea, the proportion of the urea being sufficient to bind the excess of free formaldehyde still existent in said initial condensation products.

8. The process for manufacturing condensation products from a urea with formaldehyde which comprises transforming the first formed soluble initial condensation products, containing free formaldehyde, into the insoluble final products in presence of an added urea, in a ratio of 1 molecule of urea to 2 molecules of such formaldehyde as exists in the free state in the said initial condensation product.

9. The process for manufacturing condensation products which comprises heating the soluble initial condensation products resulting from the action of 600 parts by weight of an aqueous solution of formaldehyde (say 40 per cent by volume) upon 100 parts by weight of urea until 60 per cent of the whole weight of the liquid are distilled off, thereby leaving a product still containing some free formaldehyde, adding to such product a quantity of urea calculated to represent one molecule of urea to each two molecules of free formaldehyde in such intermediate product, submitting the mixture after the solution of the urea to further evaporation in a vacuum apparatus to about the utmost point of viscosity at which the mass is still capable of being cast, filling the said mass into molds and then hardening it by heat the temperature being raised in the last period of this hardening process to 100 degrees centigrade.

10. The process for manufacturing condensation products which comprises heating the soluble initial condensation products resulting from the action of 600 parts by weight of an aqueous solution of formaldehyde (say 40 per cent by volume) upon 100 parts by weight of urea until 60 per cent of the whole weight of the liquid are distilled off, thereby leaving a product still containing some free formaldehyde, adding to such product a quantity of urea calculated to represent one molecule of urea to each two molecules of free formaldehyde in such intermediate product, submitting the mixture after the solution of the urea to further evaporation in a vacuum apparatus at a temperature below 50 degrees centigrade to about the utmost point of viscosity at which the mass is still capable of being cast, filling the said mass into molds and then hardening it by heat, the temperature being raised in the last period of this hardening process to 100 degrees centigrade.

In testimony whereof we affix our signatures.

FRITZ POLLAK.
KURT RIPPER.

Witnesses:
CARL CONDENBERG,
RICHARD BREINER.